(12) United States Patent
Kure et al.

(10) Patent No.: US 9,936,093 B2
(45) Date of Patent: Apr. 3, 2018

(54) IMAGE READING APPARATUS AND SHEET PROCESSING APPARATUS

(71) Applicant: Kabushiki Kaisha Toshiba, Minato-ku (JP)

(72) Inventors: Shota Kure, Kawasaki (JP); Teruhiko Uno, Mitaka (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/065,195

(22) Filed: Mar. 9, 2016

(65) Prior Publication Data

US 2017/0070633 A1 Mar. 9, 2017

(30) Foreign Application Priority Data

Sep. 8, 2015 (JP) ................. 2015-176266

(51) Int. Cl.
*G06T 5/00* (2006.01)
*H04N 1/04* (2006.01)
(Continued)

(52) U.S. Cl.
CPC ........... *H04N 1/02865* (2013.01); *G07D 7/12* (2013.01); *G07D 7/121* (2013.01);
(Continued)

(58) Field of Classification Search
CPC ........... H04N 1/02865; H04N 1/00641; H04N 1/00726; H04N 1/00737; H04N 1/00761;
(Continued)

(56) References Cited

U.S. PATENT DOCUMENTS 5,617,187 A * 4/1997 Hayashi ............... G03G 21/046
250/271
5,650,863 A * 7/1997 Utagawa ............... G03G 21/046
358/475
(Continued)

FOREIGN PATENT DOCUMENTS

EP 1 158 459 A1 11/2001
JP 2010-191887 9/2010

OTHER PUBLICATIONS

Combined Russian Office Action and Search Report dated May 12, 2017 in Russian Patent Application No. 2016107730 (with English language translation).

*Primary Examiner* — Cheukfan Lee
(74) *Attorney, Agent, or Firm* — Oblon, McClelland, Maier & Neustadt, L.L.P.

(57) ABSTRACT

An image reading apparatus includes a sensor, a light source, and an image-capture controller. The sensor has a sensitivity area that is in a predetermined wavelength band, and acquires an image signal in accordance with light from sheet. The light source has a first light emitting unit that emits first light having a wavelength within the sensitivity area of the sensor, and a second light emitting unit that emits second light that has a wavelength which is outside of the sensitivity area of the sensor and that excites a fluorophore applied on the sheet. The image-capture controller irradiates the sheet with the first light and the second light to acquire a first image signal using the sensor, and irradiates, after acquiring the first image signal, the sheet with only the second light to acquire a second image signal using the sensor.

7 Claims, 6 Drawing Sheets (51) Int. Cl.
    *H04N 1/028*     (2006.01)
    *H04N 1/00*      (2006.01)
    *G07D 7/12*      (2016.01)
    *G07D 7/121*     (2016.01)
(52) U.S. Cl.
    CPC ..... *H04N 1/00641* (2013.01); *H04N 1/00726* (2013.01); *H04N 1/00737* (2013.01); *H04N 1/00761* (2013.01); *H04N 1/00763* (2013.01); *H04N 2201/0081* (2013.01)
(58) Field of Classification Search
    CPC ....... H04N 1/00763; H04N 2201/0081; G07D 7/12; G07D 7/121
    See application file for complete search history.

(56) References Cited

U.S. PATENT DOCUMENTS

| | | | |
|---|---|---|---|
| 6,051,826 A * | 4/2000 | Arimoto | G07D 7/12 250/208.1 |
| 6,373,965 B1 | 4/2002 | Liang | |
| 6,892,946 B2 * | 5/2005 | Massen | G07D 7/121 235/454 |
| 8,654,414 B2 * | 2/2014 | Han | H04N 1/40056 358/474 |
| 8,723,141 B2 * | 5/2014 | Ueoka | G07D 7/121 250/458.1 |
| 2002/0074501 A1 * | 6/2002 | Isoda | C09K 11/7768 250/363.01 |
| 2009/0022390 A1 | 1/2009 | Yacoubian et al. | |
| 2010/0214632 A1 | 8/2010 | Ikari et al. | |
| 2010/0296141 A1 * | 11/2010 | Maruyama | H04N 1/02865 358/509 |
| 2011/0122466 A1 * | 5/2011 | Tanimura | H04N 1/00846 358/518 |
| 2012/0150043 A1 | 6/2012 | Mahmood et al. | |
| 2013/0142414 A1 * | 6/2013 | Ikari | G07D 7/12 382/135 |
| 2013/0147181 A1 | 6/2013 | Rosset | |
| 2014/0104663 A1 * | 4/2014 | Cai | H04N 1/00761 358/509 |
| 2016/0155028 A1 * | 6/2016 | Zhang | H04N 1/04 382/135 |

* cited by examiner

IMAGE READING APPARATUS AND SHEET PROCESSING APPARATUS

CROSS-REFERENCE TO RELATED APPLICATION

This application is based upon and claims the benefit of priority from Japanese Patent Application No. 2015-176266, filed on Sep. 8, 2015, the entire contents of which are incorporated herein by reference.

FIELD

An embodiment of the present invention relates to image reading apparatuses and sheet processing apparatuses.

BACKGROUND

Conventionally, sheet processing apparatuses that inspect various kinds of sheet have been practically used. The sheet processing apparatuses each include an image reading apparatus that detects fluorescence and afterglow from sheet.

The sheet has a pattern that is printed with fluorescent ink containing a fluorophore. The fluorophore is excited by light (excitation light) having a predetermined wavelength, such as UV light, and enters a state of emitting light (fluorescence). When excitation light irradiation ends, the fluorophore enters a state of emitting light (afterglow) that gradually attenuates with time. The image reading apparatuses read a fluorescence image, which is an image of fluorescence, at a timing of irradiating the fluorophore with the excitation light, and read an afterglow image, which is an image of afterglow, in a state where irradiating the fluorophore with the excitation light is interrupted.

It takes time for the light emission intensity of fluorophore and phosphor to be saturated. In particular, the light emission intensity of the phosphor takes more time to be saturated than the light emission intensity of the fluorophore does. For this reason, the image reading apparatus needs to irradiate sheet with the excitation light until the light emission intensity of the fluorophore and the phosphor is saturated, which may cause a decrease in throughput.

DETAILED DESCRIPTION

An image reading apparatus according to an embodiment includes a sensor, a light source, and an image-capture controller. The sensor has a sensitivity area that is in a predetermined wavelength band, and acquires an image signal in accordance with light from sheet. The light source has a first light emitting unit that emits first light having a wavelength within the sensitivity area of the sensor, and a second light emitting unit that emits second light that has a wavelength which is outside of the sensitivity area of the sensor and that excites fluorophore applied on the sheet. The image-capture controller irradiates the sheet with the first light and the second light using the first light emitting unit and the second light emitting unit to acquire a first image signal using the sensor, and irradiates, after acquiring the first image signal, the sheet with only the second light using the second light emitting unit to acquire a second image signal using the sensor.

Hereinafter, an image reading apparatus and a sheet processing apparatus according to an embodiment will be described in detail with reference to the drawings.

Figure 1:
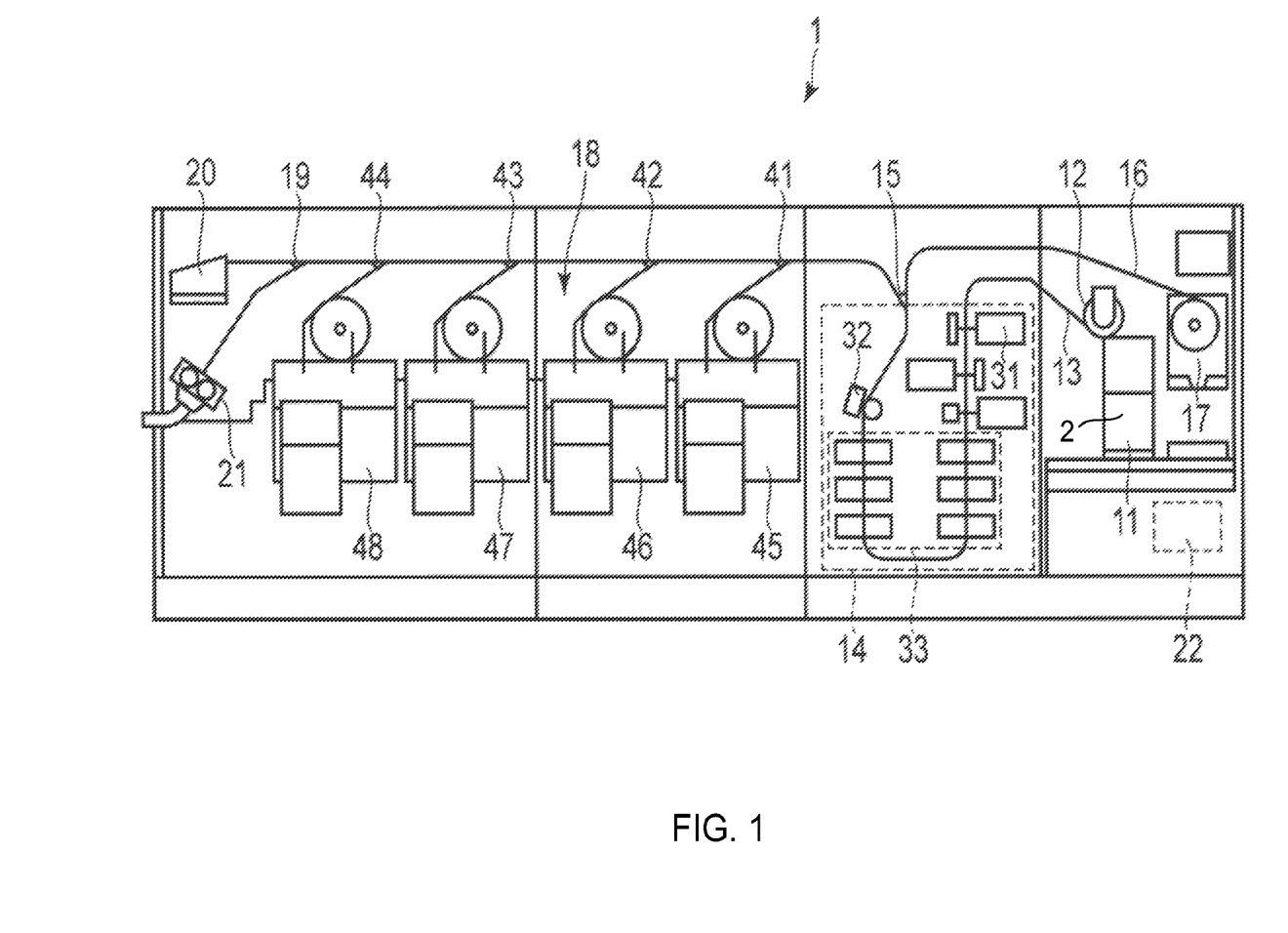
FIG. 1 is a diagram for illustrating an exemplary configuration of a sheet processing apparatus according to an embodiment.
Figure 2:
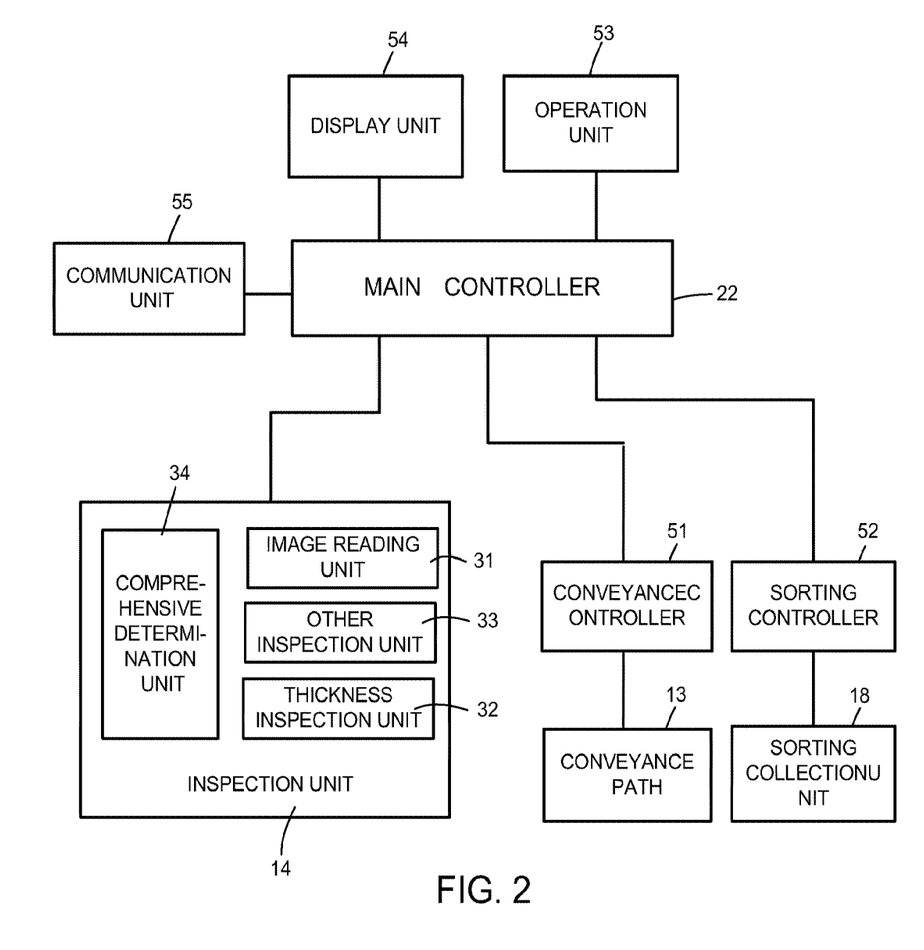
FIG. 2 is a diagram for illustrating an exemplary configuration of a sheet processing apparatus according to an embodiment.

FIG. 1 shows an exemplary configuration of a conveyance system of a sheet processing apparatus 1 according to an embodiment. FIG. 2 shows an exemplary configuration of a control system of the sheet processing apparatus 1.

The sheet processing apparatus 1 performs various kinds of inspection on sheet, identifies the sheet based on an inspection result, and sorts and collects the sheet based on an identification result. For example, the sheet processing apparatus 1 acquires various images from sheet, and identifies a denomination of the sheet, authenticity, a damage status, and the like of the sheet based on the acquired image.

As shown in FIG. 1, the sheet processing apparatus 1 includes a supply unit 11, a separation roller 12, a conveyance path 13, an inspection unit 14, a first gate 15, a removal conveyance path 16, a removal collection unit 17, a sorting collection unit 18, a second gate 19, a damaged ticket collection unit 20, a cutting unit 21, and a main controller 22. As shown in FIG. 2, the sheet processing apparatus 1 includes a conveyance controller 51, a sorting controller 52, an operation unit 53, a display unit 54, and a communication unit 55.

The supply unit 11 stocks sheet 2 to be taken into the sheet processing apparatus 1. The supply unit 11 collectively receives the sheet 2 in a stacked state.

The separation roller 12 is installed at an end portion of the supply unit 11. The separation roller 12 takes the sheet 2 sheet-by-sheet into the conveyance path 13 from a bundle of the sheet 2 that has been put into the supply unit 11. For example, the separation roller 12 takes the sheet 2 into the conveyance path 13 in a fixed cycle.

The conveyance path 13 is a conveyance unit that conveys the sheet 2 to each part within the sheet processing apparatus 1. The conveyance path 13 includes a conveyance belt, a drive pulley, a drive motor, and the like, which are not shown in the diagram. The drive motor is driven to rotate the drive pulley on the conveyance path 13, thereby operating the conveyance belt, which is hung around the drive pulley, at a fixed speed. The conveyance path 13 conveys the sheet 2 at a fixed speed in a state where the sheet 2, which has been taken in by the separation roller 12, is sandwiched by a pair of conveyance belts. Note that in the following description, a side near the separation roller 12 on the conveyance path 13 will be referred to as the upstream side, and the opposite side will be referred to as the downstream side.

The inspection unit 14 performs various kinds of inspection on the sheet 2 that is being conveyed by the conveyance path 13. The inspection unit 14 identifies the sheet 2 based on an inspection result. Specifically, the inspection unit 14 identifies a denomination of the sheet, authenticity, a damage status, and the like of the sheet 2. The inspection unit 14 notifies the main controller 22 of an identification result.

The inspection unit 14 includes, for example, an image reading unit 31, a thickness inspection unit 32, and another inspection unit 3. As shown in FIG. 2, the inspection unit 14 also includes a comprehensive determination unit 34 that identifies the sheet 2 based on results of the inspection performed by the image reading unit 31, the thickness inspection unit 32, and the other inspection unit 33. The image reading unit 31 acquires an image from the sheet 2. The image reading unit 31 reads, from the sheet 2, color images of red (R), blue (B), and green (G), an infrared image (IR image), a fluorescence image, an afterglow image, and the like, for example. A detailed configuration of the image reading unit 31 will be described later. The thickness inspection unit 32 inspects the thickness of the sheet 2 that is conveyed by the conveyance path 13. Furthermore, the inspection unit 14 may include a magnet sensor that detects magnetism from the sheet 2, or the like as the other inspection unit 33.

The comprehensive determination unit 34 determines, regarding the sheet 2, the denomination of the sheet, the authenticity, the damage status, whether two sheets have been simultaneously taken, and the like based on the results of the inspection performed by the image reading unit 31, the thickness inspection unit 32, and the other inspection unit 33. For example, the comprehensive determination unit 34 includes a memory in which criteria data, which serves as determination criteria, is stored. Specifically, the criteria data is color image, an infrared image, a fluorescence image, an afterglow image, or the like of each denomination of the sheet of the sheet. The comprehensive determination unit 34 compares the color images, the infrared image, the fluorescence image, and the afterglow image that have been read from the sheet 2 with the criteria data stored in the memory, thereby determining the denomination of the sheet, the authenticity, the damage status, and the like of the sheet 2. The comprehensive determination unit 34 notifies the main controller 22 of the determination results regarding the denomination of the sheet, the authenticity, the damage status, and the like of the sheet 2.

The comprehensive determination unit 34 also detects whether two sheets of the sheet 2 have been simultaneously taken, based on the thickness of the sheet 2 detected by the thickness inspection unit 32. For example, if the value of the thickness of the sheet 2 detected by the thickness inspection unit 32 is larger than or equal to a preset threshold value, the comprehensive determination unit 34 determines that two sheets of the sheet 2 have been simultaneously taken. If it is determined that two sheets of the sheet 2 have been simultaneously taken, the comprehensive determination unit 34 notifies the main controller 22 of this determination.

The first gate 15 is provided on the downstream side of the inspection unit 14. The first gate 15 is a mechanism for switching a conveyance destination of the sheet 2 between the removal collection unit 17 side and the sorting collection unit 18 side.

If the removal collection unit 17 side is selected as the conveyance destination by the first gate 15, the removal conveyance path 16 conveys the sheet 2 to the removal collection unit 17. The configuration of the removal conveyance path 16 is similar to that of the conveyance path 13.

The removal collection unit 17 is provided at a terminal of the removal conveyance path 16. The sheet 2 that has been conveyed by the removal conveyance path 16 is collected in the removal collection unit 17.

The sorting collection unit 18 sorts the sheet 2 and thereafter collects the sheet 2 in an collection container. The sorting collection unit 18 is provided downstream of the first gate 15. As shown in FIG. 1, the sorting collection unit 18 includes a third gate 41, a fourth gate 42, a fifth gate 43, a sixth gate 44, a first collection container 45, a second collection container 46, a third collection container 47, and a fourth collection container 48.

The third gate 41 is a mechanism for switching the conveyance destination of the sheet 2 between the first collection container 45 and the conveyance path 13 located on the downstream side. If the first collection container 45 is selected as the conveyance destination by the third gate 41, the sheet 2 is collected in the first collection container 45. The fourth gate 42 is a mechanism for switching the conveyance destination of the sheet 2 between the second collection container 46 and the conveyance path 13 located on the downstream side. If the second collection container 46 is selected as the conveyance destination by the fourth gate 42, the sheet 2 is collected in the second collection container 46. The fifth gate 43 is a mechanism for switching the conveyance destination of the sheet 2 between the third collection container 47 and the conveyance path 13 located on the downstream side. If the third collection container 47 is selected as the conveyance destination by the fifth gate 43, the sheet 2 is collected in the third collection container 47. The sixth gate 44 is a mechanism for switching the conveyance destination of the sheet 2 between the fourth collection container 48 and the conveyance path 13 located on the downstream side. If the fourth collection container 48 is selected as the conveyance destination by the sixth gate 44, the sheet 2 is collected in the fourth collection container 48. Furthermore, the first collection container 45, the second collection container 46, the third collection container 47, and the fourth collection container 48 may each have a configuration in which the sheet 2 is bundled every time a predetermined number of sheets of the sheet 2 is collected.

The second gate 19 is a mechanism for switching the conveyance destination of the sheet 2 between the damaged ticket collection unit 20 and the cutting unit 21. The second gate 19 is provided downstream of the sorting collection unit 18.

The damaged ticket collection unit 20 is provided at a terminal of the conveyance path 13 via the second gate 19. If the damaged ticket collection unit 20 is selected as the conveyance destination by the second gate 19, the conveyed sheet 2 is collected in the damaged ticket collection unit 20.

The cutting unit 21 is provided at a terminal of a conveyance path that is branched from the conveyance path 13 via the second gate 19. If the cutting unit 21 is selected as the conveyance destination by the second gate 19, the sheet 2 is conveyed to the cutting unit 21, and the cutting unit 21 cuts the conveyed sheet 2.

The main controller 22 comprehensively controls operations of the sheet processing apparatus 1. The main controller 22 includes a CPU and a memory. The CPU performs various kinds of arithmetic processing. The memory stores various programs that are to be executed by the CPU, control data, and the like. The main controller 22 executes various kinds of processing by executing the programs stored in the memory using the CPU.

For example, the main controller 22 counts the sheet 2 based on a result of the determination performed by the comprehensive determination unit 34. The main controller 22 determines the conveyance destination (sorting destination) of the sheet 2 based on the result of the determination performed by the comprehensive determination unit 34. The main controller 22 controls operations of the gates and the conveyance path 13 by controlling the conveyance controller 51 and the sorting controller 52 shown in FIG. 2. The main controller 22 conveys the sheet 2 to the determined conveyance destination by controlling the conveyance controller 51 and the sorting controller 52 in accordance with the determined conveyance destination of the sheet 2.

The conveyance controller 51 controls operations of the conveyance path 13 and the removal conveyance path 16. The conveyance controller 51 controls the conveyance of the sheet 2 by driving the drive motor for the conveyance path 13 and the removal conveyance path 16 based on the control of the main controller 22, for example.

The sorting controller 52 controls operations of the gates, namely the first gate 15, the second gate 19, the third gate 41, the fourth gate 42, the fifth gate 43, and the sixth gate 44. The sorting controller 52 conveys the sheet 2 to the conveyance destination indicated by the main controller 22, by switching the gates based on the control of the main controller 22, for example.

The operation unit 53 accepts various kinds of operation input given by an operator. The operation unit 53 generates an operation signal based on an operation that is input by the operator, and transmits the generated operation signal to the main controller 22. The operation unit 53 includes a keyboard and a mouse, for example.

The display unit 54 displays various screens based on the control of the main controller 22. The display unit 54 is a display, for example. For example, the display unit 54 displays various kinds of operation guidance, processing results, and the like for the operator. Note that the operation unit 53 and the display unit 54 may be integrally formed as a touch panel.

The communication unit 55 transmits and receives data to/from an external device connected to the sheet processing apparatus 1, or a storage medium. For example, the communication unit 55 includes a disk drive, a USB connector, a LAN connector, other interfaces that enable data transmission and reception, or the like. The sheet processing apparatus 1 can acquire data from the external device connected to the communication unit 55, or the storage medium. The sheet processing apparatus 1 can also transmit a processing result to the external device connected to the communication unit 55, or the storage medium.

The main controller 22 determines the conveyance destination of the sheet 2 based on the determination result of which the main controller 22 has been notified by the comprehensive determination unit 34. For example, the main controller 22 determines the conveyance destination of the sheet 2 from among the removal collection unit 17, the first collection container 45, the second collection container 46, the third collection container 47, the fourth collection container 48, the damaged ticket collection unit 20, and the cutting unit 21.

For example, the main controller 22 determines the removal collection unit 17 as the conveyance destination of the sheets 2 which have been determined to be two sheets being simultaneously taken by the comprehensive determination unit 34. In another case, for example, the main controller 22 determines the removal collection unit 17 as the conveyance destination of the sheet 2 that has been determined to be a false ticket by the comprehensive determination unit 34.

The main controller 22 determines the damaged ticket collection unit 20 or the cutting unit 21 as the conveyance destination of the sheet 2 that has been determined to be a damaged ticket by the comprehensive determination unit 34. For example, the main controller 22 determines the damaged ticket collection unit 20 or the cutting unit 21 as the conveyance destination of a damaged ticket in accordance with a setting. Specifically, in the case of a setting of collecting damaged tickets, the main controller 22 determines the damaged ticket collection unit 20 as the conveyance destination of the damaged ticket. In the case of a setting of cutting a damaged ticket, the main controller 22 determines the cutting unit 21 as the conveyance destination of a damaged ticket.

The main controller 22 determines any of the collection containers in the sorting collection unit 18 to be the conveyance destination of the sheet 2 that has been determined to be a true ticket by the comprehensive determination unit 34. For example, the main controller 22 determines different collection containers as conveyance destinations of respective denomination of the sheets of the sheet 2 regarding which the determination has been made by the comprehensive determination unit 34. That is to say, the main controller 22 controls the conveyance controller 51 and the sorting controller 52 such that different denomination of the sheets of the sheet 2 are collected in the respective collection containers, which are the first collection container 45, the second collection container 46, the third collection container 47, and the fourth collection container 48.

Note that the sheet 2 that is to be processed by the sheet processing apparatus 1 has a pattern printed with fluorescent ink which contains fluorophore, a patter printed with infrared ink, and a patter printed with color ink. The fluorophore is excited by light (excitation light) having a predetermined wavelength, such as UV light, and enters a state of emitting light (fluorescence). When excitation light irradiation ends, the fluorophore enters a state of emitting light (afterglow) that gradually attenuates with time.

There are two types of fluorophore, namely fluorophore having a fluorescent characteristic with fast response to the excitation light, and fluorophore (also referred to as phosphor) having a phosphorous characteristic with slow response to the excitation light. The fluorophore having the fluorescent characteristic takes less time to enter a state of not emitting light after excitation light irradiation ends than the phosphor does. For this reason, detection of afterglow of the phosphor is enabled in a period from when excitation light irradiation ends and the fluorophore enters a state of not emitting light until the phosphor enters a state of not emitting light.

Note that the fluorophore and the phosphor are composed of a material for which invisible light serves as the excitation light. For example, the fluorophore and the phosphor emit fluorescence as a result of ultraviolet light (UV), which is invisible light, being used as the excitation light.

Figure 3:
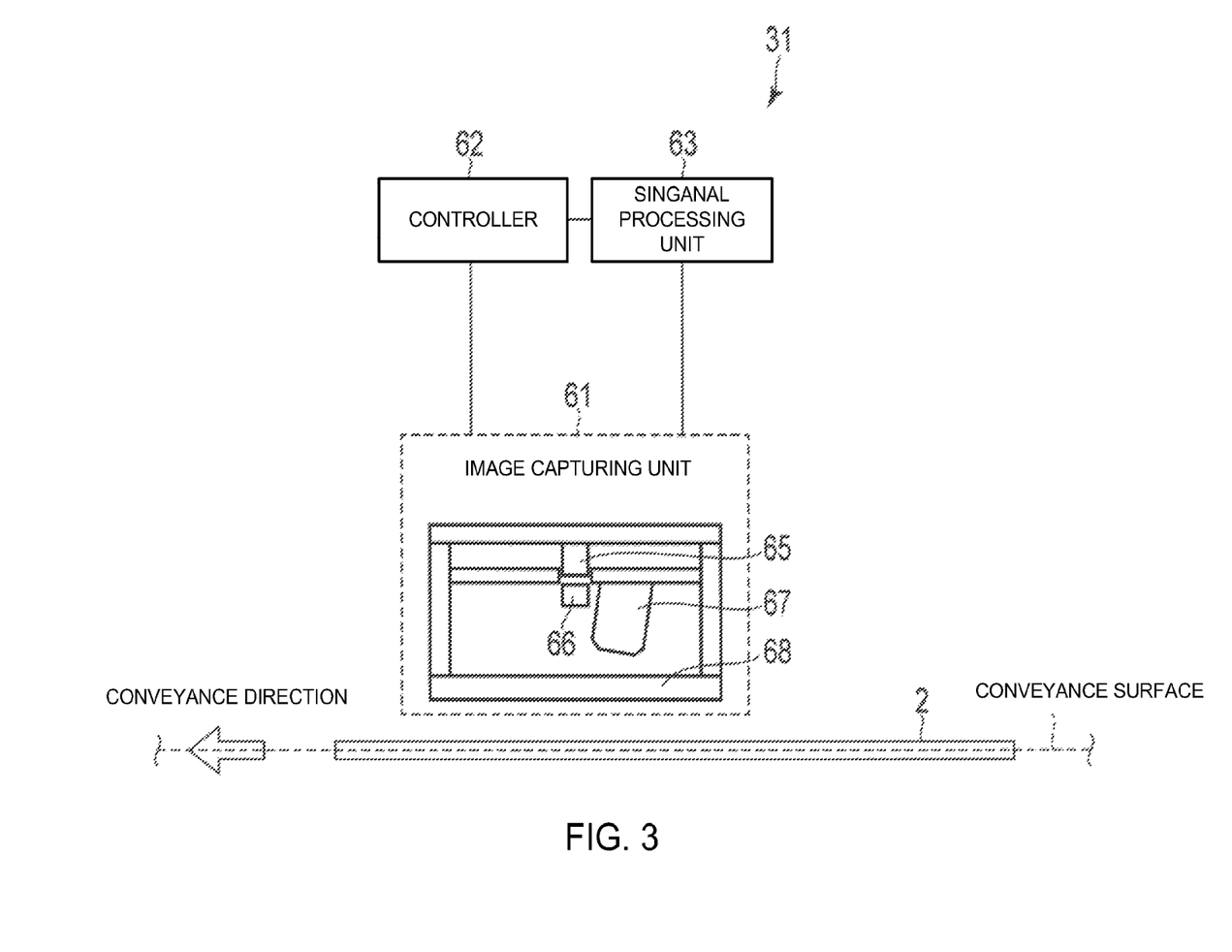
FIG. 3 is a diagram for illustrating an exemplary configuration of an image reading apparatus according to an embodiment.

Next, an exemplary configuration of the image reading unit 31 will be described.

The image reading unit 31 reads a fluorescence image, which is an image of fluorescence, at a timing of irradiating the sheet 2 with the excitation light, and reads an afterglow image, which is an image of afterglow, in a state where excitation light irradiation is interrupted. The image reading unit 31 also reads the color images and the infrared image at timings of irradiating the sheet 2 with visible light or near infrared light. The image reading unit 31 reads light having different wavelengths using a single optical system and sensor by reading images while varying the wavelength of the light with which the sheet 2 is irradiated.

FIG. 3 shows an exemplary configuration of the image reading unit 31. The image reading unit 31 includes an image capturing unit 61, a controller 62, and a signal processing unit 63.

The image capturing unit 61 acquires images of the sheet 2 that is being conveyed at a fixed speed by the conveyance path 13. The image capturing unit 61 acquires the images while varying the wavelength of the light with which the sheet 2 is irradiated, in accordance with the control of the controller 62. The image capturing unit 61 includes a sensor 65, a lens 66, a light source 67, and a glass cover 68.

The sensor 65 is an image sensor provided with a plurality of pixels that converts light into electric signals. The sensor 65 is a monochrome linear image sensor, for example. That is to say, the sensor 65 has an imaging surface in which the plurality of pixels are arranged in a line. The sensor 65 converts an image formed on the imaging surface into electric signals in accordance with the control of the controller 62, thereby acquiring image signals of the sheet 2 for a single line.

Figure 4:
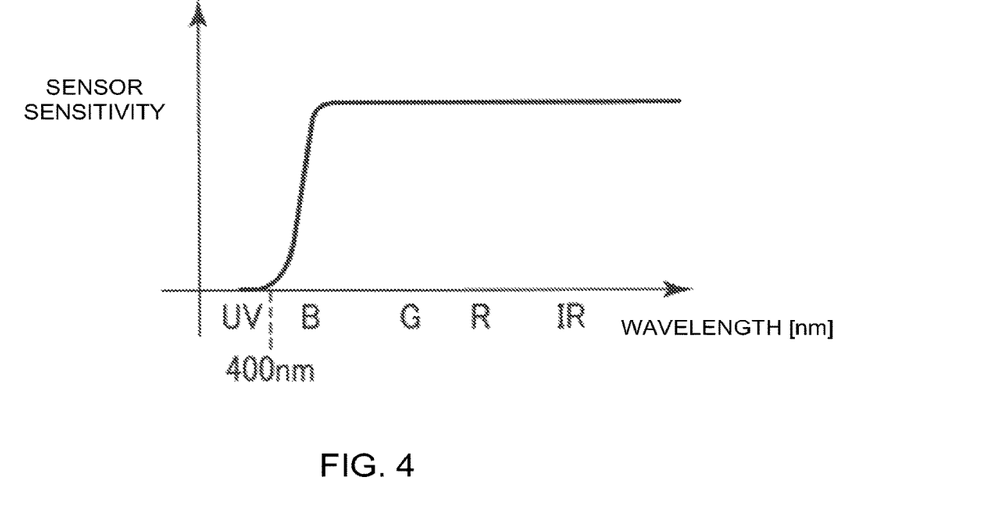
FIG. 4 is a diagram for illustrating a sensitivity characteristic of a sensor according to an embodiment.

FIG. 4 is a diagram showing an exemplary sensitivity characteristic of the sensor 65. The sensor 65 is insensitive to ultraviolet light, and is sensitive to blue, green, and red light, which are visible light, and near infrared (IR) light, which is invisible light. That is to say, the sensor 65 is configured to be insensitive to the light in the wavelength band that corresponds to the excitation light for the fluorophore and the phosphor used in the sheet 2 to be inspected, and sensitive to the light in the wavelength band from blue to near infrared light. That is to say, the sensitivity area of the sensor 65 is the wavelength band from blue to near infrared light. More specifically, the sensor 65 is configured to be insensitive to the light having a wavelength less than 400 nm, which is the wavelength band of ultraviolet light. The sensor 65 may be constituted by, for example, an image sensor such as a charge coupled device (CCD) or a complementary metal oxide semiconductor (CMOS) having the above-described characteristic, or may be configured to include a filter through which ultraviolet light is not transmitted and light having wavelengths from blue to near infrared light is transmitted (long-pass filter or band pass filter etc.)

The lens 66 is an optical system that causes the light from a reading area to form an image on the imaging surface of the sensor 65. The reading area of the lens 66 is a linear area on a conveyance surface on which the sheet 2 is conveyed, for example. The lens 66 is constituted by a self-focusing lens, such as a Selfoc (registered trademark) lens.

The light source 67 is a light source that irradiates the sheet 2 with the light. The light source 67 irradiates at least the reading area of the lens 66 with light. For example, the light source 67 includes LED elements that emit light, and a light-guiding member that causes the reading area of the lens 66 to be irradiated with the light from the LED elements.

The light source 67 switches the wavelength of the light with which the sheet 2 is irradiated, in accordance with the control of the controller 62. For example, the light source 67 includes a plurality of LED elements (light-emitting unit) that emit light having different wavelengths. The light source 67 switches the wavelength of the light with which the sheet 2 is irradiated, by individually switching the lighting status of the plurality of LED elements based on the control of the controller 62. More specifically, the light source 67 includes the plurality of LED elements that respectively emit light in wavelength bands of ultraviolet, blue, green, red, and near infrared light. The light source 67 irradiates the sheet 2 with light having one or a plurality of the wavelengths of ultraviolet, blue, green, red, and near infrared light by individually switching the lighting status of the plurality of LED elements based on the control of the controller 62.

The glass cover 68 is a protection member that prevents sheet powder from being attached to the lens 66 and the light source 67.

The image capturing unit 61 acquires image signals by blue, green, and red light and infrared light, and image signals by fluorescence and afterglow that are obtained by the fluorophore and the phosphor being excited by ultraviolet light, as a result of acquiring the image signals using the sensor 65 while switching the light-emitting wavelength of the light source 67.

The controller 62 is an image-capture controller that controls operations of each part of the image reading unit 31. The controller 62 includes a CPU and a memory. The CPU performs various kinds of arithmetic processing. The memory stores various programs that are to be executed by the CPU, control data, and the like. The main controller 22 executes various kinds of processing by executing the programs stored in the memory using the CPU. The controller 62 controls the scanning timing of the sensor 65 of the image capturing unit 61, and the light-emitting timing and the light-emitting wavelength of the light source 67.

The signal processing unit 63 performs signal processing on the image signals obtained by the image capturing unit 61. For example, the signal processing unit 63 acquires image data by converting analog image signals acquired by the image capturing unit 61 into digital signals. The signal processing unit 63 acquires an image of the sheet 2 by converting image signals for a single line acquired by the image capturing unit 61 into image data, and combining the image data for multiple lines.

Figure 5:
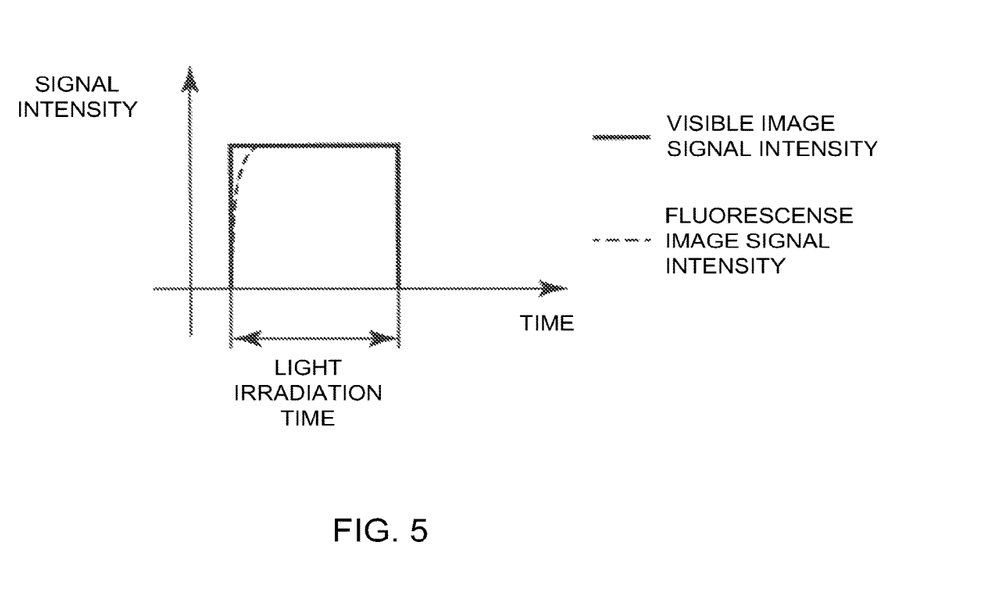
FIG. 5 is a diagram for illustrating a time characteristic of fluorescence emission of fluorophore according to an embodiment.
Figure 6:
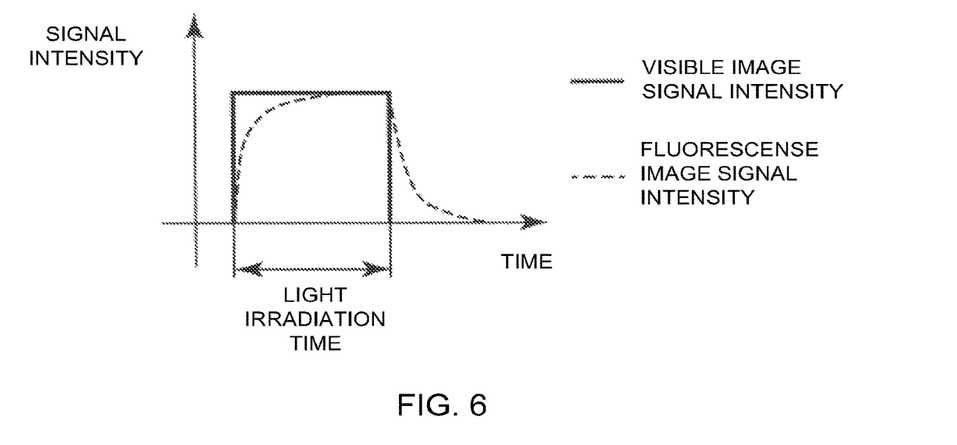
FIG. 6 is a diagram for illustrating a time characteristic of phosphorescence emission of phosphor according to an embodiment.

Note that it takes time for the light-emission intensity of the fluorophore and the phosphor to be saturated. In particular, the light-emission intensity of the phosphor takes more time to be saturated than the light-emission intensity of the fluorophore does. FIG. 5 shows a schematic diagram of a time characteristic of fluorescence emission of the fluorophore. FIG. 6 shows a schematic diagram of a time characteristic of phosphorescence emission of the phosphor. In order to acquire a clear fluorescence image, it is desirable to acquire the fluorescence image after irradiating the fluorophore with the excitation light until the light emission intensity thereof is saturated. Furthermore, in order to acquire a clear afterglow image, it is desirable to stop excitation light irradiation after the light emission intensity of the phosphor is saturated, and then acquire the afterglow image. For this purpose, the controller 62 executes the light emission using the light source 67 and the scanning using the sensor 65 at timings shown in FIGS. 7 and 8.

Figure 7:
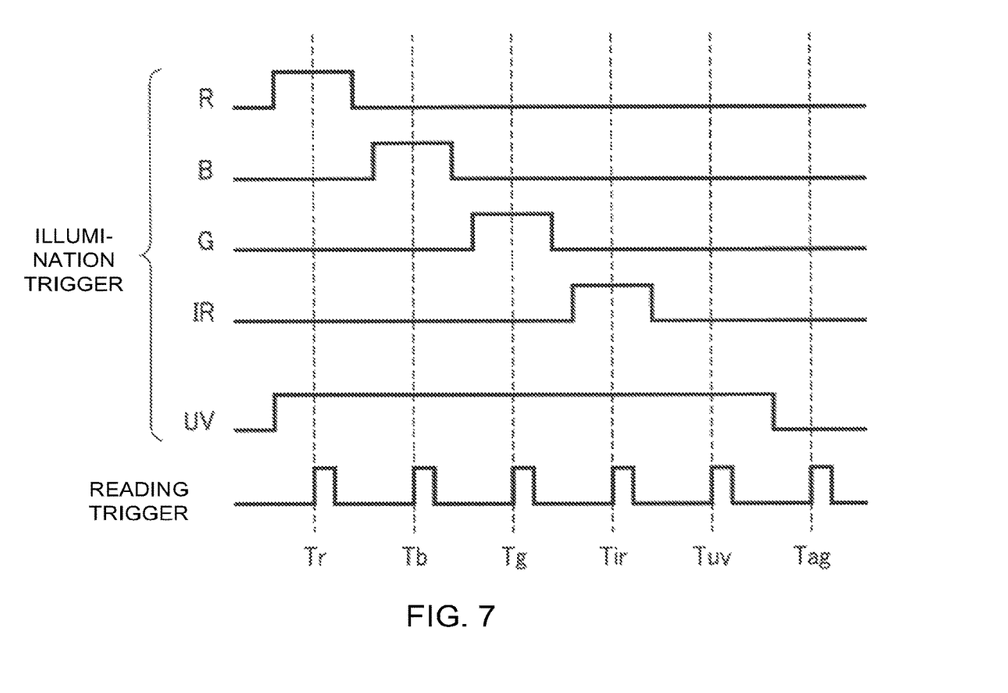
FIG. 7 is a diagram for illustrating operations of the image reading apparatus according to an embodiment.
Figure 8:
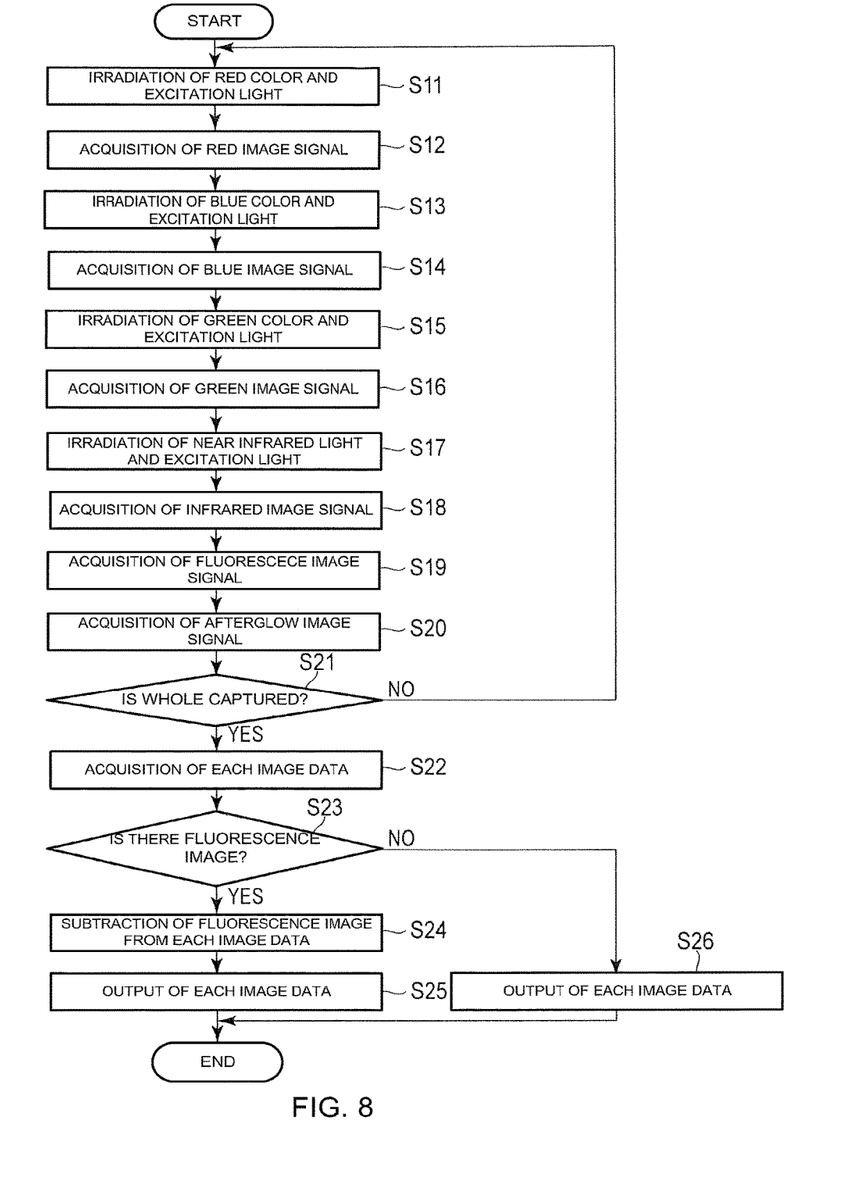
FIG. 8 is a diagram for illustrating operations of the image reading apparatus according to an embodiment.

FIGS. 7 and 8 are diagrams for illustrating operations of the image reading unit 31. FIG. 7 is a timing chart showing timings of the light emission of the light source 67 and timing of the scanning of the sensor 65 for respective wavelengths. FIG. 8 is a flowchart showing exemplary operations of the image reading unit 31.

The controller 62 causes the sensor 65 to execute the scanning by inputting a reading trigger shown in FIG. 7 to the image capturing unit 61. That is to say, the controller 62 causes the sensor 65 to execute the scanning by turning on the reading trigger. Furthermore, the controller 62 controls the timing and the light emission wavelength of the light emission of the light source 67 by inputting illumination triggers for the respective wavelengths shown in FIG. 7 to the image capturing unit 61.

The controller 62 causes light in the red wavelength band and ultraviolet light to be output from the light source 67 at a timing Tr of acquiring a red image (step S11). The controller 62 acquires a red image signal using the sensor 65 at this timing Tr (step S12). After acquiring the red image signal using the sensor 65, the controller 62 causes the light source 67 to stop the emission of the light in the red wavelength band.

The controller 62 causes light in the blue wavelength band and ultraviolet light to be output from the light source 67 at a timing Tb of acquiring a blue image (step S13). The controller 62 acquires a blue image signal using the sensor 65 at this timing Tb (step S14). After acquiring the blue image signal using the sensor 65, the controller 62 causes the light source 67 to stop the emission of the light in the blue wavelength band.

The controller 62 causes light in the green wavelength band and ultraviolet light to be output from the light source 67 at a timing Tg of acquiring a green image (step S15). The controller 62 acquires a green image signal using the sensor 65 at this timing Tg (step S16). After acquiring the green image signal using the sensor 65, the controller 62 causes the light source 67 to stop the emission of the light in the green wavelength band.

The controller 62 causes light in the near infrared wavelength band and ultraviolet light to be output from the light source 67 at a timing Tir of acquiring an infrared image (step S17). The controller 62 acquires an infrared image signal using the sensor 65 at this timing Tir (step S18). After acquiring the infrared image signal using the sensor 65, the controller 62 causes the light source 67 to stop the emission of the light in the near infrared wavelength band.

The controller 62 continues the ultraviolet light output from the light source 67 from the timing Tr of acquiring the red image until a timing Tuv of acquiring a fluorescence image, and acquires, at the timing Tuv, an image signal of the fluorescence excited by the ultraviolet light using the sensor 65 (step S19). That is to say, at the timing Tuv, the light source 67 is in a state of outputting only the ultraviolet light. After acquiring the fluorescence image signal using the sensor 65, the controller 62 causes the light source 67 to stop the emission of the light in the ultraviolet wavelength band.

The controller 62 acquires, at a timing Tag, an image signal of afterglow that is emitted from the phosphor excited from the timing Tr until the timing Tuv using the sensor 65 (step S20). At the timing Tag, the light source 67 is in a state of stopping the output of the visible light (blue, green, and red), infrared light, and ultraviolet light.

After acquiring the afterglow image signal using the sensor 65, the controller 62 determines whether or not an image of the entire sheet 2 has been captured (step S21). For example, the controller 62 determines whether or not an image of the entire sheet 2 has been captured based on the output of a sensor (not shown) for detecting the position of the sheet 2. The controller 62 may also be configured to determine whether or not an image of the entire sheet 2 has been captured based on the control of the main controller 22.

If it is determined that an image of the entire sheet 2 has not been captured (step S21, NO), the controller 62 proceeds the processing to processing in step S11. Thus, the controller 62 repeatedly performs the scanning with the processing from the timing Tr up to the timing Tag as one cycle, thereby acquiring the red image signal, the blue image signal, the green image signal, the infrared image signal, the fluorescence image signal, and the afterglow image signal from the entire sheet 2.

The signal processing unit 63 converts the image signals for multiple lines into digital signals and combines these digital signals, thereby acquiring the image data of the entire sheet 2 (step S22). For example, the signal processing unit 63 converts the red image signals for multiple lines into digital signals and combines these digital signals, thereby acquiring the red image data of the entire sheet 2. The signal processing unit 63 converts the blue image signals for multiple lines into digital signals and combines these digital signals, thereby acquiring the blue image data of the entire sheet 2. The signal processing unit 63 converts the green image signals for multiple lines into digital signals and combines these digital signals, thereby acquiring the green image data of the entire sheet 2. The signal processing unit 63 converts the infrared image signals for multiple lines into digital signals and combines these digital signals, thereby acquiring the infrared image data of the entire sheet 2. The signal processing unit 63 converts the fluorescence image signals for multiple lines into digital signals and combines these digital signals, thereby acquiring the fluorescence image data of the entire sheet 2. The signal processing unit 63 converts the afterglow image signals for multiple lines into digital signals and combines these digital signals, thereby acquiring the afterglow image data of the entire sheet 2.

With the above processing, since the sheet 2 is also irradiated with the excitation light at the timings of acquiring the red image data, the blue image data, the green image data, and the infrared image data, the fluorescence image data is mixed into the red image data, the blue image data, the green image data, and the infrared image data. The controller 62 eliminates the influence of the fluorescence by subtracting the fluorescence image data from the red image data, the blue image data, the green image data, and the infrared image data.

The controller 62 determines whether or not the fluorescence image data has been acquired in step S22 (step S23). If it is determined that the fluorescence image data has been acquired, the controller 62 subtracts the fluorescence image data from the red image data, the blue image data, the green image data, and the infrared image data, using the signal processing unit 63 (step S24). The controller 62 outputs these image data (step S25), and ends image reading processing for a single sheet of the sheet 2. For example, the controller 62 outputs, to the comprehensive determination unit 34, the red image data, the blue image data, the green image data, and the infrared image data from each of which the fluorescence image data has been subtracted. Furthermore, the controller 62 also outputs the fluorescence image data to the comprehensive determination unit 34, for example.

If it is determined in step S23 that the fluorescence image data has not been acquired, the controller 62 outputs the red image data, the blue image data, the green image data, and the infrared image data (step S26), and ends the image reading processing for a single sheet of the sheet 2. For example, the controller 62 outputs the red image data, the blue image data, the green image data, and the infrared image data to the comprehensive determination unit 34.

With the above-described configuration, the image reading unit 31 acquires the red image data, the blue image data, the green image data, and the infrared image data by performing the scanning using the sensor 65 while switching the light emission wavelength of the light source 67 from red to blue, green, and to near infrared light. Furthermore, the image reading unit 31 causes the light source 67 to continue to output the ultraviolet light while causing the light source 67 to emit red, blue, green, and near infrared light. Furthermore, the image reading unit 31 completes the acquisition of the red image data, the blue image data, the green image data, and the infrared image data, and thereafter acquires the fluorescence image data in a state of continuing the output of ultraviolet light from the light source 67. Furthermore, the image reading unit 31 stops the output of the ultraviolet light from the light source 67 after completing the acquisition of the fluorescence image, and acquires the afterglow image data.

As a result, the image reading unit 31 can simultaneously irradiate the sheet 2 with the excitation light that is not in the wavelength band to which the sensor 65 is sensitive and is capable of exciting the fluorophore and the phosphor, and light that is in the wavelength band to which the sensor 65 is sensitive and is not capable of exciting the fluorophore and the phosphor. That is to say, the image reading unit 31 can ensure the time during which the sheet 2 is irradiated with the excitation light before the fluorescence image and the afterglow image are captured, by continuously irradiating the sheet 2 with the excitation light while irradiating the sheet 2 with the light having wavelengths that are different from the excitation light. As a result, the image reading unit 31 can shorten the time for acquiring the fluorescence image data and the afterglow image data compared with a configuration in which the sheet 2 is irradiated with the excitation light after the reading of the image using the light having wavelengths that are different from the excitation light is completed. As a result, the image reading unit 31 can improve the throughput in the reading of the image of the sheet 2. The image reading unit 31 can also increase the resolution in the conveyance direction of the sheet 2.

Furthermore, the image reading unit 31 can read the fluorescence image and the afterglow image in a stable state by ensuring the time during which the sheet 2 is irradiated with the excitation light before the fluorescence image and the afterglow image are captured. That is to say, the S/N ratio of the image signals detected from the fluorescence and the afterglow can be increased.

Furthermore, since the image reading unit 31 can read light having different wavelengths using a single optical system and sensor, space-saving and a cost reduction can be expected.

Note that although the above embodiment has described a configuration in which the fluorescence image data is subtracted from the red image data, the blue image data, the green image data, and the infrared image data as shown in step S24 in FIG. 8, the configuration is not limited thereto. Since the fluorophore takes time until light emission is stabled (saturated), there is a possibility that the light emission is not saturated by the time of the acquisition of the red image data, the blue image data, the green image data, and the infrared image data. For this reason, a configuration may be employed in which the image reading unit 31 stores a correction coefficient for the respective image data in advance in, for example, a memory of the controller 62 or the like, multiplies the fluorescence image data by the correction coefficient, and then subtracts this multiplied fluorescence image data from the red image data, the blue image data, the green image data, and the infrared image data.

For example, when the light emission intensity in a state where light emission of the fluorophore is saturated is Fmax, and the light emission intensity of the fluorophore at the timing Tr of reading the red image data is Fr, the image reading unit 31 prepares fluorescence correction data, which is to be subtracted from the red image data, by multiplying a pixel value of the fluorescence image data by a correction coefficient Fr/Fmax.

Even if the light emission of the fluorophore is not saturated, the image reading unit 31 can appropriately suppress the influence of the fluorescence by subtracting the fluorescence correction data obtained by estimating the light emission intensity of the fluorescence from the red image data. Note that the influence of the fluorescence can also be appropriately suppressed with similar processing in the blue image data, the green image data, and the infrared image data, and descriptions thereof will be omitted. With this configuration, the image reading unit 31 can more stably acquire the red image data, the blue image data, the green image data, and the infrared image data.

Note that although the above embodiment has described a configuration in which the image reading unit 31 reads the fluorescence and the afterglow to acquire the fluorescence image data and the afterglow image data, the configuration is not limited thereto. The image reading unit 31 may also be configured to read only either one of the fluorescence and the afterglow. That is to say, the image reading unit 31 may also be configured to acquire only either one of the fluorescence image data and the afterglow image data.

Although the above embodiment has described a configuration in which the image reading unit 31 subtracts the fluorescence image data from the red image data, the blue image data, the green image data, and the infrared image data, the configuration is not limited thereto. The image reading unit 31 may be configured to subtract preset data, i.e., a fixed value (correction value) from the red image data, the blue image data, the green image data, and the infrared image data. With a configuration in which a fixed value is subtracted, the fixed value being set in accordance with the light emission intensity of the fluorescence that is expected to be mixed in the red image data, the blue image data, the green image data, and the infrared image data, it is possible to reduce a processing load in the subtraction.

Note that the functions described in the above embodiment are not only configured using hardware, but can also be achieved by causing a computer to read a program in which the functions are described, using software. Each function may also be configured by selecting either software or hardware as appropriate.

Note that the present invention is not limited to the above embodiment as-is, and can also be embodied while modifying the constituent elements without departing from the gist thereof in the implementation stage. Various inventions can be formed by appropriate combining multiple constituent elements disclosed in the above embodiment. For example, some of the constituent elements described in the embodiment may be deleted. Furthermore, the constituent elements in different embodiments may be combined as appropriate.

What is claimed is:

1. An image reading apparatus comprising:
a sensor configured to acquire an image signal in accordance with light from a sheet, a sensitivity area of the sensor being a predetermined wavelength band;
a light source having a first light emitter configured to emit first light having a wavelength within the sensitivity area of the sensor, and a second light emitter configured to emit second light that has a wavelength which is outside of the sensitivity area of the sensor and that excites a fluorophore applied on the sheet;

an image-capture controller configured to irradiate the sheet with the first light and the second light using the first light emitter and the second light emitter to acquire a first image signal using the sensor, and irradiate, after acquiring the first image signal, the sheet with only the second light using the second light emitter to acquire a second image signal using the sensor; and a signal processor configured to subtract the second image signal from the first image signal.

2. The image reading apparatus according to claim 1, wherein the signal processor is configured to subtract, from the first image signal, a value that is obtained by multiplying the second image signal by a preset correction coefficient.

3. The image reading apparatus according to claim 2, wherein the correction coefficient is set in accordance with a tuning of acquiring the first image signal by the image-capture controller.

4. The image reading apparatus according to claim 1, wherein the first light includes red, blue, green, and infrared light, and the image-capture controller irradiates the sheet with the red, blue, green, and infrared light while sequentially switching a wavelength of light from the first light emitter when the second light emitter is emitting the second light, and acquires an image signal using the sensor every time the wavelength of the light of the first light emitter is switched to acquire each of a red image signal, a blue image signal, a green image signal, and an infrared image signal as the first image signal.

5. The image reading apparatus according to claim 4, wherein a correction coefficient is set in advance for each of the red image signal, the blue image signal, the green image signal, and the infrared image signal.

6. The image reading apparatus according to claim 1, wherein the second light is ultraviolet light.

7. The image reading apparatus according to claim 1, wherein the image-capture controller further stops the irradiation of the sheet with the second light to acquire a third image signal using the sensor.

* * * * *